(12) United States Patent
Mukasa (10) Patent No.: US 6,701,051 B2
(45) Date of Patent: Mar. 2, 2004

(54) OPTICAL FIBER TRANSMISSION LINE

(75) Inventor: Kazunori Mukasa, Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 9 days.

(21) Appl. No.: 10/184,802

(22) Filed: Jul. 1, 2002

(65) Prior Publication Data

US 2003/0063877 A1 Apr. 3, 2003

(30) Foreign Application Priority Data

Jul. 26, 2001 (JP) ........................... 2001-226054
Apr. 24, 2002 (JP) ........................... 2002-122826

(51) Int. Cl.[7] .............................. G02B 6/16; G02B 6/18
(52) U.S. Cl. ........................................ 385/123; 385/124
(58) Field of Search ................................. 385/123–125

(56) References Cited

U.S. PATENT DOCUMENTS 6,178,279 B1 * 1/2001 Mukasa et al. ............. 385/123
6,496,631 B2 * 12/2002 Tsukitani et al. ........... 385/123
2002/0051611 A1   5/2002 Mukasa

FOREIGN PATENT DOCUMENTS

JP          9-211511        8/1997

OTHER PUBLICATIONS

Kazunori Mukasa, et al. "Novel Network Fiber to Manage Dispersion at 1.55 μm with Combination of 1.3 μm Zero Dispersion Single Mode Fiber" 11th International Conference on Integrated Optics and Optical Fibre Communications, 23rd European Conference on Optical Communications, vol. 1, 1997, pp. 127–130.

* cited by examiner

Primary Examiner—Akm Enayet Ullah
(74) Attorney, Agent, or Firm—Oblon, Spivak, McClelland, Maier & Neustadt, P.C.

(57) ABSTRACT

A dispersion management optical fiber transmission line of a superlow loss formed by combining a plurality of optical fibers and suitable for long distance, high speed, large capacity transmission, that is, an optical fiber transmission line including a positive dispersion optical fiber having a positive dispersion and a positive dispersion slope and a negative dispersion optical fiber having a negative dispersion and negative dispersion slope and having a non-zero dispersion at the 1.55 μm, wherein the transmission loss at the 1.55 μm band of the positive dispersion fiber and the negative dispersion fiber are both not more than 0.23 dB/km and the difference in transmission losses of the two optical fibers is not more than 0.05 dB/km.

19 Claims, 6 Drawing Sheets

FIG.1

→ DIRECTION OF TRANSMISSION OF LIGHT

STEP REFRACTIVE INDEX PROFILE

FIG.6

SEGMENT CORE TYPE REFRACTIVE INDEX PROFILE

FIG.7

(W+SEGMENT CORE)TYPE REFRACTIVE INDEX PROFILE

OPTICAL FIBER TRANSMISSION LINE

BACKGROUND OF THE INVENTION

1. Field of the Invention

The present invention relates to an optical fiber transmission line, more particularly relates to an optical transmission line comprised of optical fibers for wavelength division multiplex (WDM) transmission.

2. Description of the Related Art

With optical fiber transmission lines built using optical fibers being increased in speed and capacity, WDM transmission has come to be viewed as an important technology for commercial application. The new disadvantage as non-linearity, however, arises in the optical fibers due to the higher power of the optical signals and the interaction among signal wavelengths.

Among the non-linearity phenomena, four wave mixing (FWM) has particularly serious repercussions in WDM transmission. Intensive studies are underway on methods for suppressing this. FWM is remarkable between optical signals of wavelength regions with small dispersion, so small dispersion optical fibers are known to be disadvantageous in this regard. Even the conventionally often used Non-Zero Dispersion Shifted Fibers (NZ-DSFs) having absolute values of dispersion of 2 to 8 ps/nm/km or so have been insufficient.

Further, the waveform distortion caused by self-phase modulation (SPM) or cross-phase modulation (XPM) is also a very serious disadvantage. The distortion $\Phi_{NL}$ of a signal due to SPM or XPM is generally expressed by equation (1). In equation (1), $n_2$ shows the non-linear refractive index, $A_{eff}$ shows the effective core area, and $\lambda$ shows the transmission wavelength:

$$\Phi_{NL} = (2\lambda n_2 \times L_{eff} \times P)/(A_{eff}) \quad (1)$$

Therefore, along with studies to keep down the non-linear refractive index $n_2$ as reported in OFC'97TuN1b etc., the expansion of the effective core area $A_{eff}$ has long been studied as reported in OFC'96WK15 and OFC'97TuN2. The expansion of the $A_{eff}$, however, was found to easily cause the disadvantages of an increase in the bending transmission loss, an increase in the dispersion slope, etc. in an optical fiber of a type making up a transmission line on its own such as with the conventional NZ-DSF. An NZ-DSF type transmission line is therefore also problematic in this regard.

To overcome the above disadvantages, it has been proposed to manage the dispersion for an overall transmission line built using optical fibers.

For example, Japanese Unexamined Patent Publication (Kokai) No. 9-211511 discloses a connection of a low non-linearity optical fiber having a positive dispersion and a high non-linearity optical fiber having a negative dispersion along the direction of transmission of the optical signal in the order of the low non-linearity optical fiber and the high non-linearity optical fiber to obtain the optimal optical transmission line. As specific examples, as disclosed in ECOC'97, vol. 1, p. 127, a single mode optical fiber (SMF) having a positive dispersion characteristic and a transmission line dispersion compensation optical fiber (transmission line reverse dispersion optical fiber (RDF)), having a reverse dispersion characteristic, have been proposed. These SMF and RDF have large local dispersions of about 16 to 22 ps/nm/km in terms of absolute values, so are advantageous in terms of suppressing the FWM.

Even if the FWM can be suppressed by using the above SMF or RDF, however, a dispersion of over 16 ps/nm/km accumulate in the longitudinal direction, so wavelength distortion occurs due to the dispersion in the optical transmission line. This large cumulative dispersion becomes a particularly large disadvantage at the time of high speed transmission.

Further, with an RDF having such a large dispersion value, the transmission loss generally ends up becoming more than 0.24 dB/km. Further, the transmission loss at the long wavelength side is apt to occur. In addition, with such an RDF, it suffers from the disadvantage that the polarization mode dispersion (PMD) also ends up generally becoming more than 0.07 ps/km$^{1/2}$.

Further, the NZ-DSF type transmission line and SMF+RDF type transmission line using an SMF and RDF also suffer from the above disadvantages.

SUMMARY OF THE INVENTION

An object of the present invention is to provide a new type of a low loss dispersion-management transmission line overcoming the disadvantages of non-linearity and transmission loss.

According to the present invention, there is provided an optical transmission line having a positive dispersion optical fiber having a positive dispersion and a positive dispersion slope and a negative dispersion optical fiber having a negative dispersion and a negative dispersion slope and managing dispersion to have a non-zero dispersion (for example within ±5 ps/nm/km) in the 1.55 $\mu$m band, wherein the transmission losses in the 1.55 $\mu$m band of the positive dispersion optical fiber and negative dispersion optical fiber are both not more than 0.23 dB/km and the difference of the transmission losses of the positive dispersion optical fiber and negative dispersion optical fiber is not more than 0.05 dB/km.

The optical transmission line of the present invention (1) may be of a type where one span is comprised of a positive dispersion optical fiber and negative dispersion optical fiber, (2) may be of a type where one span is comprised of a positive dispersion optical fiber, negative dispersion optical fiber, and positive dispersion optical fiber so as to deal with two-way communications, or (3) may be of a type where one span is comprised of four or more fibers so as to keep down an increase in the cumulative dispersion. The configuration of the transmission line may be determined in accordance with the situation. In each case, more advantageous characteristics are obtained than the above loss characteristics.

BRIEF DESCRIPTION OF THE DRAWINGS

These and other objects and features of the present invention will become clearer from the following description given with reference to the attached drawings, in which.

DESCRIPTION OF THE PREFERRED EMBODIMENTS

First Embodiment

According to the thinking of the inventors, the lowest transmission loss of a conventional SMF+RDF type optical transmission line using an SMF for the front of the transmission line and an RDF for the rear which could be obtained in the 1.55 $\mu$m band was 0.215 dB/km. The reason was because despite the transmission loss of the positive dispersion optical fiber (SMF) being reduced down to 0.19 to 0.20 dB/km or so, the transmission loss of the RDF is a large 0.24 dB/km or more in the 1.55 $\mu$m band. With this, a reduction in the transmittable distance due to the transmission loss or non-linearity due to the increase in the input power to the RDF are incurred. There is the means of further reducing the transmission loss of the front positive dispersion optical fiber (SMF), but this would mean a stronger power would enter the RDF, so is not too preferable. In this sense, the difference of the transmission losses of the positive dispersion optical fiber and negative dispersion optical fiber is preferably small. A difference of the transmission losses of more than 0.05 dB/km such as in a conventional dispersion management transmission line is not preferable.

Therefore, as a first embodiment of the present invention, the inventors constructed a transmission line wherein not only the positive dispersion optical fiber, but also the negative dispersion optical fiber had a loss of not more than 0.23 dB/km and thereby reduced the difference in transmission losses between the two to not more than 0.05 dB/km, preferably 0.04 dB/km.

Figure 1:
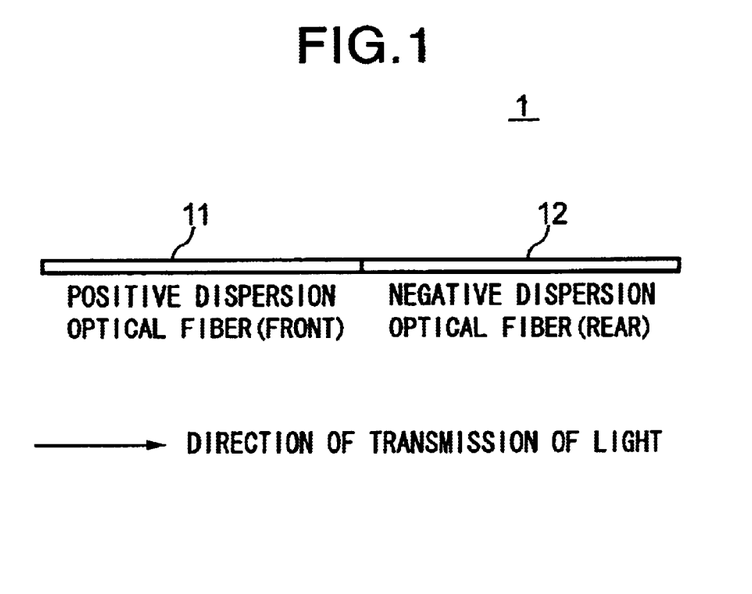
FIG. 1 is a view of the configuration of an optical transmission line according to an embodiment of the present invention.

As shown in FIG. 1, the inventors connected a positive dispersion optical fiber 11 and a negative dispersion optical fiber 12 to construct a transmission line 1 and investigated the degree of wavelength distortion due to the non-linearity effect when increasing the difference of transmission losses between the positive dispersion optical fiber 11 positioned at the front of the transmission line 1 and the negative dispersion optical fiber 12 positioned at the rear while keeping the total transmission loss of the transmission line 1 constant. For comparison, use was made of an NZ-DSF type optical transmission line having a transmission loss of 0.215 dB/km and an effective core area $A_{eff}$ of 50 $\mu$m$^2$ and the wavelength distortion due to the non-linearity occurring in that optical transmission line was normalized as the index "1". Under these conditions, the inventors investigated how the wavelength distortion changed when increasing the difference in transmission losses while maintaining constant the ratio of lengths of the positive dispersion optical fiber 11 and negative dispersion optical fiber 12 making up the transmission line 1.

The conditions for investigation are as follows: a total transmission loss of the transmission line 1 of 0.215 dB/km at the time of an effective core area $A_{eff}$ of the positive dispersion optical fiber 11 of 90 $\mu$m$^2$, an effective core area $A_{eff}$ of the negative dispersion optical fiber 12 of 30 $\mu$m$^2$, and, a length of the positive dispersion optical fiber 11 of 25 km and a length of the negative dispersion optical fiber 12 of 25 km, namely, a length of one span is 50 km.

Figure 2:
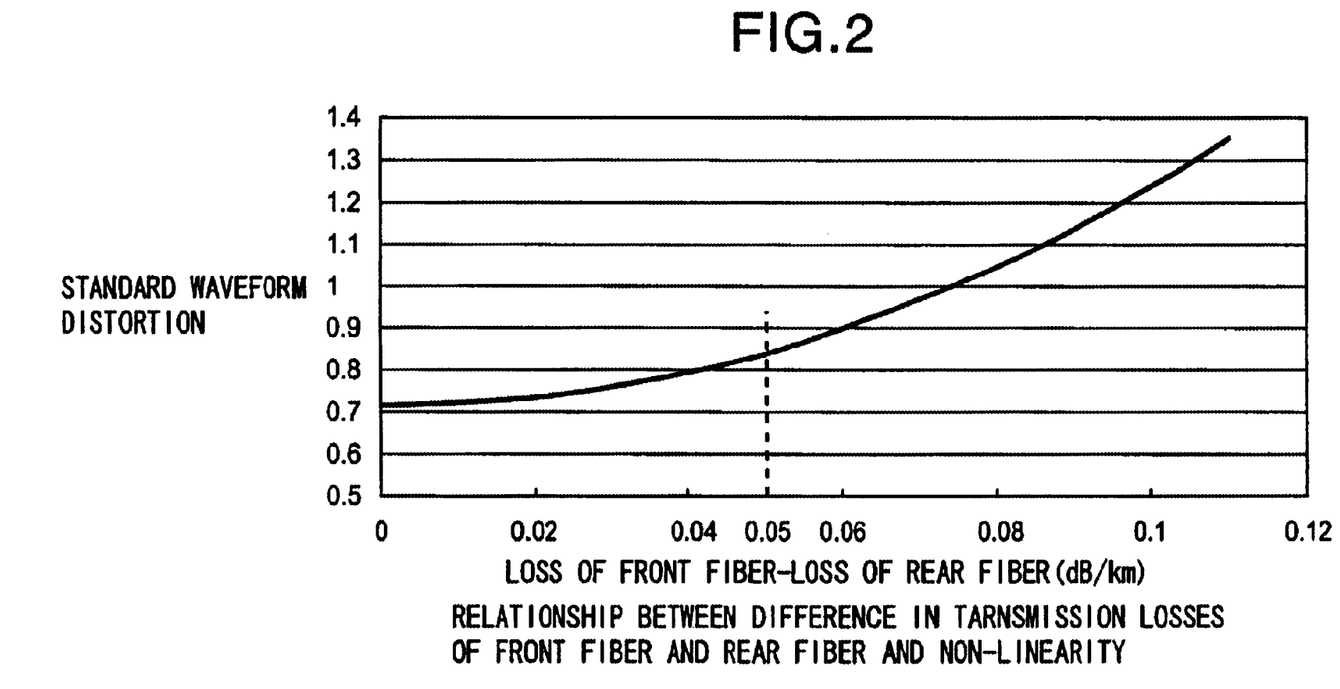
FIG. 2 is a graph of the relationship between the difference in transmission losses of a front fiber and a rear fiber and non-linearity in an embodiment of the present invention.

As clear from FIG. 2, the non-linearity becomes prominent from near a difference in transmission loss of 0.05 dB/km. Therefore, it was learned that the difference in transmission losses between the front positive dispersion optical fiber 11 and rear negative dispersion optical fiber 12 should be not more than 0.05 dB/km.

Note that a transmission loss of not more than 0.04 dB/km gives a higher linearity. Therefore, the difference in transmission losses is preferably not more than 0.04 dB/km.

Second Embodiment

Further, according to the thinking of the inventors, a conventional RDF generally tends to increase in transmission loss at the long wavelength side due to bending transmission loss. The transmission loss at 1580 nm tends to be considerably higher than the transmission loss at 1550 nm. This makes it difficult to adjust the difference in wavelength loss even at the time of C-Band transmission and becomes a serious disadvantage of increased transmission loss at the long wavelength side in the case of use of the L-Band.

Therefore, as a second embodiment, the inventors constructed a transmission line 1 comprised of a positive dispersion optical fiber 11 and negative dispersion optical fiber 12 both having a transmission loss of not more than 0.23 dB/km even in 1580 nm. Basically, by keeping the bending transmission loss of the negative dispersion optical fiber 12 a small value, it is possible to suppress an increase in transmission loss at the long wavelength side and provide a negative dispersion optical fiber 12 having a small bending transmission loss.

Third Embodiment

Further, as a third embodiment, the inventor constructed a transmission line of an optical fiber having a dispersion reduced from the conventional SMF or RDF in the 1.55 $\mu$m band. To completely suppress the occurrence of FWM, the absolute value of the dispersion was made not less than 10 ps/nm/km. By doing this, it is possible to ease the problem of the large cumulative chromatic dispersion suffered by an SMF+RDF type transmission line. Further, in general, the ability to reduce the absolute value of dispersion of the negative dispersion optical fiber means an increased freedom of design of the distribution of refractive index of the optical fiber (achievability even with a low relative refractive index difference $\Delta 1$ between the cladding and core) and enables the transmission loss to be easily kept to a small value. As a further advantage, the polarization mode dispersion (PMD), which is very dependent on the relative refractive index difference Δ1, can also be kept to a small value.

Figure 3:
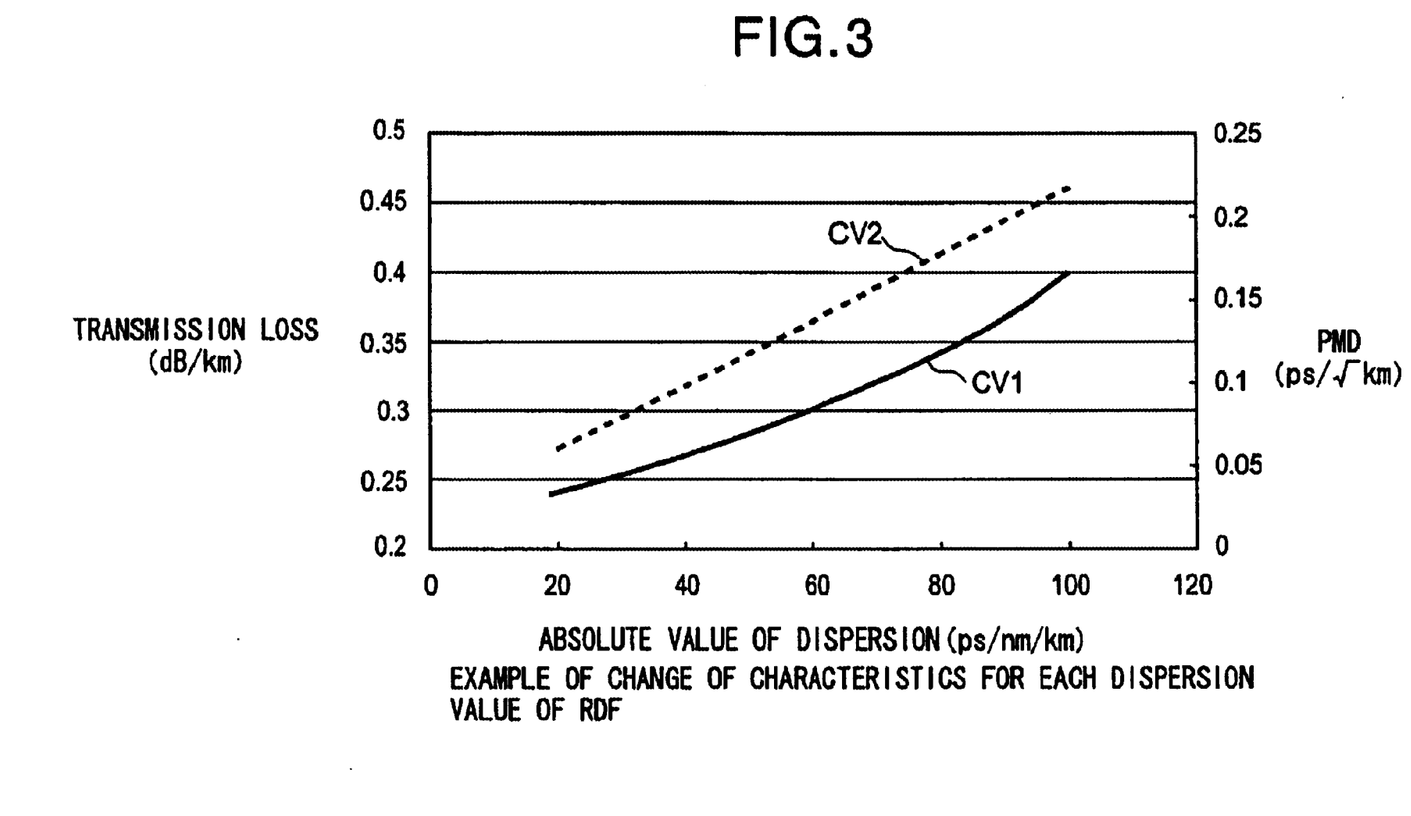
FIG. 3 is a graph of the relationship between the dispersion of a negative dispersion optical fiber and its characteristics.

FIG. 3 is a graph showing the results of investigation of the relationship among the dispersion of the negative dispersion optical fiber (abscissa), transmission loss (curve CV1), and the polarization mode dispersion (PMD) (curve CV2). As shown in FIG. 3, it is learned that reduction of the dispersion has merits in the transmission loss and PMD. Therefore, the inventors constructed a transmission line by combining a positive dispersion fiber having a dispersion in the 1.55 μm band of 10 to 15 ps/nm/km or so and a negative dispersion optical fiber having a dispersion in the 1.55 μm band of −15 to −10 ps/nm/km or so. By this, it becomes possible to not only keep down the transmission loss, but also to keep the PMD down to a low value of for example not more than 0.06 ps/km$^{1/2}$.

Fourth Embodiment

Of course, even if optimizing the negative dispersion optical fiber 12, when the transmission loss of the positive dispersion optical fiber 11 is large, it is no longer possible to keep the total transmission loss of the transmission line a small value. Therefore, as a fourth embodiment of the present invention, the transmission loss of the positive dispersion optical fiber 11 is not only made not more than 0.23 dB/km, but also preferably made not more than the conventional record of 0.20 (preferably 0.195) dB/km. It was learned that the transmission loss of the negative dispersion optical fiber 12 is also preferably made not more than 0.225 dB/km by optimization of the design. If the dispersion of the positive dispersion optical fiber 11 is 14 ps/nm/km and its transmission loss is 0.19 dB/km and the dispersion of the negative dispersion optical fiber 12 is −14 ps/nm/km and its transmission loss is 0.22 dB/km, when the length of the positive dispersion optical fiber is made 25 km and the length of the negative dispersion optical fiber is made 25 km, the total transmission loss of the transmission line 1 becomes 0.205 dB/km or so or an extremely low loss characteristic. Further, the cumulative chromatic dispersion of the transmission line formed in this way is kept lower than that of an SMF+RDF type transmission line.

Fifth Embodiment

Further, the positive dispersion optical fiber 11 generally has a positive dispersion slope, so the negative dispersion optical fiber 12 is preferably given a negative dispersion slope. The dispersion slope of the positive dispersion optical fiber 11 is in almost all cases 0.06 to 0.08 ps/nm$^2$/km, so if the dispersion slope of the negative dispersion optical fiber 12 is not more than −0.02 ps/nm$^2$/km (preferably not more than −0.03 ps/nm$^2$/km), with the optical transmission line 1 of the fifth embodiment of the present invention combining the positive dispersion optical fiber 11 and negative dispersion optical fiber 12, it becomes possible to achieve a low dispersion slope of not more than 0.03 ps/nm$^2$/km—which was difficult to achieve with a conventional NZ-DSF type transmission line. As illustrated in FIG. 1, constructing the optical transmission line 1 by combining the positive dispersion optical fiber 11 and negative dispersion optical fiber 12 has merits from the viewpoint of reducing the dispersion slope in this way as well.

Sixth Embodiment

A small transmission loss and dispersion slope are extremely important in a transmission line. If the effective core area $A_{eff}$ is small, however, the disadvantage of non-linearity arises. Therefore, the inventor discovered that it is preferable to make the $A_{eff}$ of the front positive dispersion optical fiber 11 to which a stronger power is input at least 80 μm$^2$ (preferably at least 90 μm$^2$) and make the $A_{eff}$ of the rear negative dispersion optical fiber 12 to which the relatively weak power is input at least 30 μm$^2$. In the rear optical fiber 12, however, the $A_{eff}$ must be of an extent not causing an increase in the transmission loss at the long wavelength side due to the bending transmission loss. Further, considering the possibility of use of a Raman amplifier, it was learned that the $A_{eff}$ is preferably 30 μm$^2$ to 34 μm$^2$ or so. Of course, when no increase in the transmission loss would occur, depending on the situation, it would be possible to further increase the $A_{eff}$.

To investigate the characteristic of the increase in transmission loss at the long wavelength side, the inventors investigated the relationship between the bending transmission loss and the transmission loss in a conventional RDF. The results are shown in FIG. 4.

Figure 4:
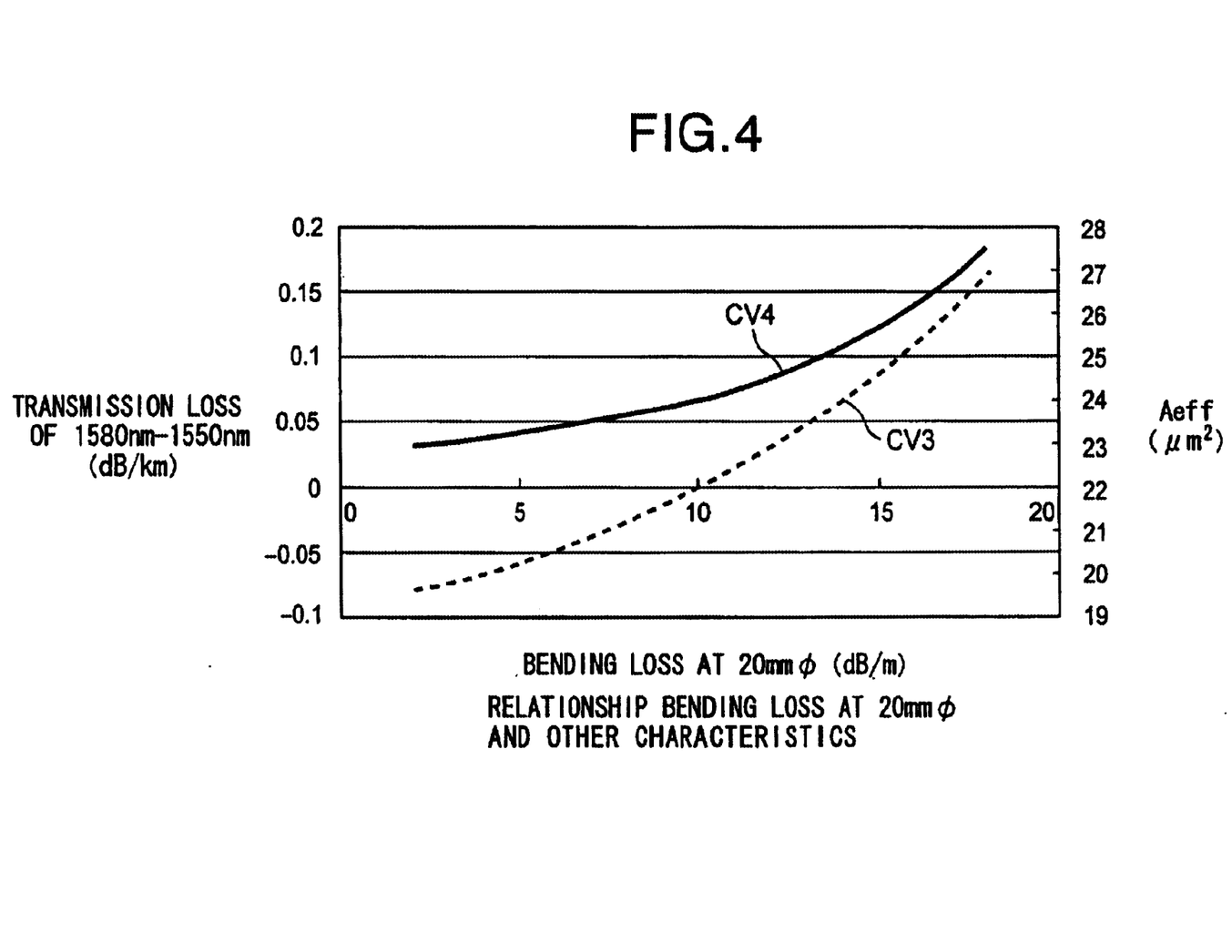
FIG. 4 is a graph of the relationship between the bending loss and changes in characteristics of an RDF.

The "bending transmission loss" means the increase in transmission loss at a certain wavelength when bending the optical transmission line by a certain diameter of curvature (in the example of FIG. 4, a curvature of 20 (mmΦ)).

As shown in FIG. 4, in a conventional type RDF, increasing the bending transmission loss makes it possible to increase the $A_{eff}$ shown by the broken line (curve CV3), but it is learned that the transmission loss at the long wavelength side shown by the solid line (curve CV2) increases. To hold the difference in the transmission losses at 1580 nm and 1550 nm to not more than 0.05 dB/km, it was learned that the bending transmission loss at 20 mmΦ must be kept down to at least not more than 10 dB/m (preferably not more than 8 dB/m).

To achieve the above transmission line 1, the inventors designed a positive dispersion optical fiber 11 and a negative dispersion optical fiber 12. As a result, they learned that the above characteristic can be obtained by a distribution of the refractive index of the step profile shown in FIG. 5, the segment core profile shown in FIG. 6, and the W+segment core profile shown in FIG. 7 for a positive dispersion optical fiber and the W+segment core profile shown in FIG. 7 for a negative dispersion optical fiber.

Figure 5:
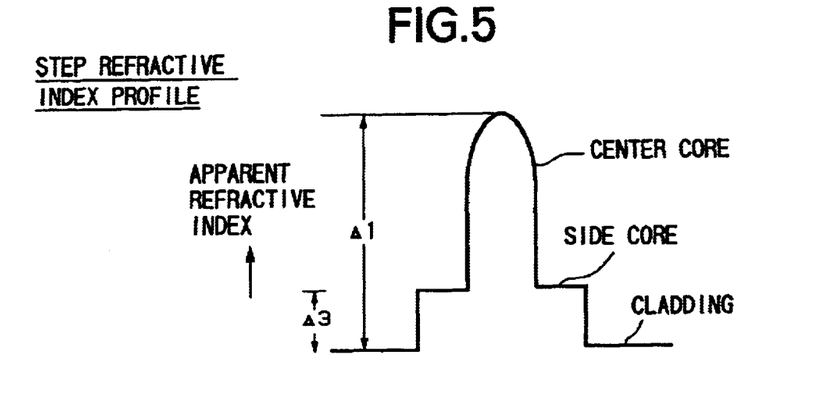
FIG. 5 is a view of a step refractive index profile of an embodiment of the present invention.
Figure 6:
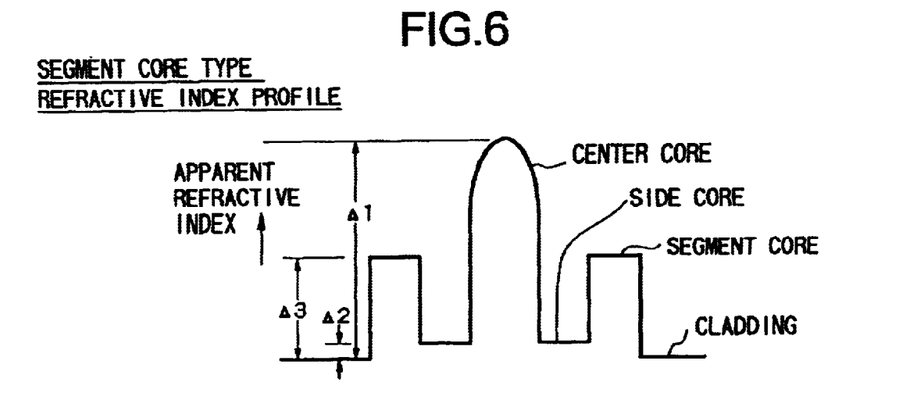
FIG. 6 is a view of a segment core type refractive index profile of an embodiment of the present invention.
Figure 7:
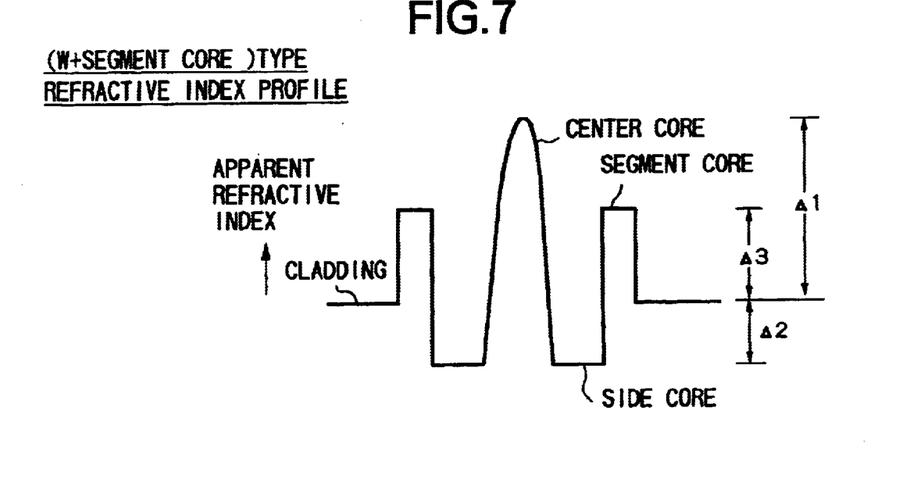
FIG. 7 is a view of a W+segment core type refractive index profile of an embodiment of the present invention.

In FIG. 5 to FIG. 7, the center core is located at the center.

The "step profile" of FIG. 5 is a distribution of the refractive index comprised of a high refractive index center core positioned at the center and a flat side core with a smaller refractive index than the center core formed around it. A cladding with a smaller refractive index than the side core is formed around the side core.

Seventh Embodiment

A typical positive dispersion optical fiber, that is, a conventional SMF, has a simple two-layer structure comprised of a center core and a cladding provided around it. Such an SMF has a low relative refractive index difference Δ1 between the refractive index of the core and refractive index of the cladding of 0.4%, so the $A_{eff}$ is large and a transmission loss of not more than 0.195 dB/km is achieved.

Such an SMF, however, generally has a dispersion in the 1.55 μm band of at least 16 ps/nm/km and therefore suffers from the disadvantage of a large dispersion.

Note that the relative refractive index difference Δ1 between the refractive index of the core and the refractive index of the cladding is defined by the following equation:

$$\Delta 1 = \frac{n_1^2 - n_0^2}{2n_1^2} \simeq \frac{n_1 - n_0}{n_1}$$

where, $n_1$ is the refractive index of the core and
$n_0$ is the refractive index of the cladding.

Therefore, first, the inventors studied the suppression of the dispersion by a three-layer structure. If the refractive index of the center core is made small, the rise in the sensitivity (effect) with respect to the bending transmission loss not only causes the transmission loss to increase to at least 0.20 dB/km, but also the $A_{eff}$ ends up falling to not more than 80 μm², so the relative refractive index difference Δ1 was maintained at about 0.4% (for example, 0.35 to 0.45%).

Under these conditions, as shown in FIG. 5, it was learned that there is a possibility of obtaining the desired dispersion when adding a side core layer having a relative refractive index difference Δ2 between the refractive index of the cladding and the refractive index of the side core of 0.05 to 0.25% and having a ratio of the diameter b of the side core to the diameter a of the center core (b/a) of 1.8 to 2.7. Good characteristics were obtained as a result of a simulation. Examples of the fiber are shown in Table 1.

TABLE 1

Results of Simulation of Positive Dispersion Fiber
(Three-Layer Structure)

| Δ1 % | α | Δ2 % | b/a | Dispersion (ps/nm/km) | Slope (ps/nm²/km) | $A_{eff}$ (μm²) | λc (nm) | Bending 20Φ (dB/m) |
|---|---|---|---|---|---|---|---|---|
| 0.43 | 2.0 | 0.10 | 2.0 | 14.6 | 0.068 | 97.6 | 1546 | 6.0 |
| 0.41 | 2.0 | 0.15 | 2.3 | 14.4 | 0.070 | 94.1 | 1520 | 7.0 |
| 0.39 | 6.0 | 0.10 | 2.5 | 14.0 | 0.069 | 90.4 | 1548 | 8.0 |

Note that the relative refractive index difference Δ2 between the cladding and side core is defined by the following equation:

$$\Delta 2 = \frac{n_2^2 - n_0^2}{2n_2^2} \simeq \frac{n_2 - n_0}{n_2}$$

where, $n_0$ is the refractive index of the cladding and
$n_2$ is the refractive index of the side core.

In Table 1, "Δ1" indicates the relative refractive index difference between the refractive index of the core and the refractive index of the cladding, "α" indicates a parameter expressing the shape of the profile of the distribution of refractive index of the center core, "Δ2" indicates the relative refractive index difference between the refractive index of the cladding and the refractive index of the side core, "b/a" indicates the ratio of the diameter b of the side core to the diameter a of the center core, "Dispersion" indicates the dispersion value, "Slope" indicates the dispersion slope, "$A_{eff}$" indicates the effective core area, "$λ_c$" indicates the cutoff wavelength, and "Bending 20" indicates the bending transmission loss at 20 mmΦ.

Good characteristics were obtained for the dispersion, $A_{eff}$, and bending transmission loss. Further, since the relative refractive index difference Δ1 was made about 0.4%, a transmission loss of not more than 0.195 dB/km could also be expected. Therefore, for example, it was learned that an optical transmission line 1 aimed at by the present invention could be obtained by such a step profile (FIG. 5).

Eighth Embodiment

As explained above, the inventors suppressed the dispersion to not more than 15 ps/nm/km, but they also tried studying structures having profiles of four or more layers shown in FIG. 6 and FIG. 7 aiming to further suppress the dispersion. In exactly the same way, they set the value of the relative refractive index difference Δ1 between the cladding and the center core to about 0.4% and adjusted the parameters of the relative refractive index difference Δ2 between the cladding and the side core, the relative refractive index difference Δ3 between the cladding and the segment core, and the ratio a:b:c of the diameters so as to obtain the optimal $A_{eff}$, $λ_c$, dispersion, etc. They learned that to obtain a large $A_{eff}$ of at least 80 μm² and a $λ_c$ of not more than 1550 nm while satisfying the condition of a dispersion of 10 to 15 ps/nm/km, it is necessary to make the relative refractive index difference Δ2 −0.10 to 0.10%, the relative refractive index difference Δ3 0.10 to 0.25%, b 1.3 to 1.9, and c 2.2 to 2.8. Profiles of good characteristics obtained as a result of simulation are shown in Table 2.

TABLE 2

Results of Simulation of Positive Dispersion Fiber
(Four-Layer Structure)

| Δ1 % | α | Δ2 % | Δ3 % | a:b:c | Dispersion (ps/nm/km) | Slope (ps/nm²/km) | $A_{eff}$ (μm²) | λc (nm) | Bending 20Φ (dB/m) |
|---|---|---|---|---|---|---|---|---|---|
| 0.42 | 8.0 | 0 | 0.10 | 1:1.5:2.5 | 12.0 | 0.065 | 85.9 | 1449 | 6.0 |
| 0.41 | 10.0 | 0 | 0.20 | 1:1.8:2.5 | 11.4 | 0.071 | 81.9 | 1495 | 7.0 |
| 0.40 | 10.0 | −0.1 | 0.10 | 1:1.4:2.5 | 10.9 | 0.073 | 80.5 | 1362 | 8.0 |

$$\Delta 3 = \frac{n_3^2 - n_0^2}{2n_3^2} \simeq \frac{n_3 - n_0}{n_3}$$

where, $n_0$ is the refractive index of the cladding and $n_3$ is the refractive index of the segment core.

In Table 2, "Δ1" indicates the relative refractive index difference between the refractive index of the core and the refractive index of the cladding, "α" indicates a parameter expressing the shape of the profile of the distribution of refractive index of the center core, "Δ2" indicates the relative refractive index difference between the refractive index of the cladding and the refractive index of the side core, "Δ3" indicates the relative refractive index difference between the refractive index of the cladding and the refractive index of the segment core, "a:b:c" indicates the ratio of the diameter a of the center core, the diameter b of the side core, and the diameter c of the segment core, "Dispersion" indicates the dispersion value, "Slope" indicates the dispersion slope, "$A_{eff}$" indicates the effective core area, "$\lambda_c$" indicates the cutoff wavelength, and "Bending 20" indicates the bending transmission loss at 20 mmΦ.

As clear from the results, optical transmission lines having good characteristics could be obtained by the segment core type profile (FIG. 6) or the W+segment core type profile (FIG. 7).

Ninth Embodiment

Further, the inventors optimized the negative dispersion optical fiber. A conventional RDF uses a W-shape distribution of refractive index and reduces the relative refractive index difference Δ1 until the limit of the bending transmission loss so as to achieve a low loss characteristic and a low dispersion. It would be possible to further reduce the transmission loss or absolute value of dispersion by reducing the relative refractive index difference Δ1 further, but the bending transmission loss would become extremely large. By adding the segment core layer at the outside of the W-shape refractive index, however, the bending transmission loss can be suppressed. Therefore, the inventors used the W+segment core type profile such as shown in FIG. 7 to study profiles satisfying the dispersion at 1.55 μm of −15 to −10 ps/nm/km, and enabling an expansion of the $A_{eff}$ to at least 30 μm² in the range of an extremely small bending transmission loss (not more than 10 dB/km at 20 mmΦ).

The inventors selected a value of about 0.85% (for example, 0.8 to 0.9%) as the apparent refractive difference Δ1 between a cladding and center core satisfying a transmission loss of not more than 0.23 dB/km. When the relative refractive index difference Δ1 is not more than 0.80%, the transmission loss at the long wavelength side due to the increase of the bending transmission loss can occur. Further, it was learned that a parameter a expressing the shape of the profile of the distribution of the refractive index of the center core of around 2.0 (for example, 1.5 to 3.0) enables the dispersion slope to be made a small value of −0.030 ps/nm²/km or less. Further, the inventors studied the optimal side structure for various relative refractive index differences Δ1 and as a result learned that the optimal range for the relative refractive index difference Δ2 between the cladding and side core is −0.45 to −0.35% and the relative refractive index difference Δ3 between the cladding and the segment core is 0.15 to 0.25%. To suppress the increase in transmission loss at the long wavelength side, a relative refractive index difference Δ2 of at least −0.45% is necessary, but it was learned that if the relative refractive index difference Δ2 is not made −0.35% or less, the dispersion slope ends up becoming a large −0.03 ps/nm²/km or more. Further, to suppress an increase in the transmission loss at the long wavelength side, the relative refractive index difference Δ3 has to be at least 0.15%, but if the relative refractive index difference Δ3 exceeds 0.35%, the $\lambda_c$ increases to 1500 nm or more and it no longer is possible to meet the single mode condition.

Further, the inventors adjusted the value of the ratio a:b:c of the diameter a of the center core, the diameter b of the side core, and the diameter c of the segment core. When the ratio of a:b was 1:(1.7 to 1:2.0), a low bending transmission loss characteristic was obtained while maintaining a good value of other characteristics. When less than the ratio of 1.7, it was learned that the dispersion characteristics became poor, while when more than 2.0, $\lambda_c$ ended up becoming a large one of 1500 nm or more. Further, when the ratio of a:c was 1:2.3 to 1:3.0, it was learned that the bending transmission loss was not impaired at 10 dB/m (20 mmΦ) or less and the cutoff wavelength $\lambda_c$ was maintained at 1500 nm or less while maintaining the dispersion slope at a high compensation rate of −0.03 ps/nm²/km or less. Therefore, the inventors selected a diameter ratio (a:b:c) of 1:(1.7 to 2.0):(2.3 to 3.0).

Examples of the profiles for obtaining good characteristics while maintaining the transmission loss at a low value, as obtained from results of simulation, are shown below.

TABLE 3

Results of Simulation of Negative Dispersion Fiber (1)

| Δ1 % | α | Δ2 % | Δ3 % | a:b:c | Dispersion (ps/nm/km) | Slope (ps/nm²/km) | $A_{eff}$ (μm²) | λc (nm) | Bending 20Φ (dB/m) |
|---|---|---|---|---|---|---|---|---|---|
| 0.85 | 2.0 | −0.40 | 0.30 | 1:1.9:2.5 | −14.0 | −0.045 | 31.8 | 1498 | 6.0 |
| 0.83 | 2.0 | −0.40 | 0.20 | 1:1.9:2.5 | −13.8 | −0.037 | 32.5 | 1326 | 7.0 |
| 0.82 | 2.0 | −0.40 | 0.20 | 1:2.0:2.9 | −13.4 | −0.052 | 31.7 | 1486 | 8.0 |

In Table 3, "Δ1" indicates the relative refractive index difference between the refractive index of the core and the refractive index of the cladding, "α" indicates a parameter expressing the shape of the profile of the distribution of refractive index of the center core, "Δ2" indicates the relative refractive index difference between the refractive index of the cladding and the refractive index of the side core, "Δ3" indicates the relative refractive index difference between the refractive index of the cladding and the refractive index of the segment core, "a:b:c" indicates the ratio of the diameter a of the center core, the diameter b of the side core, and the diameter c of the segment core, "Dispersion" indicates the dispersion value, "Slope" indicates the dispersion slope, "$A_{eff}$" indicates the effective core area, "$\lambda_c$" indicates the cutoff wavelength, and "Bending 20" indicates the bending loss at a curvature of 20 mm.

more than 2.2, the cutoff wavelength $\lambda_c$ shifts to a long wavelength side higher than 1500 nm. Further, the ratio of a:c was made 1:2.7 to 1:3.0. When more than the ratio of 2.7, the bending transmission loss was not more than 10 dB/m (20 mmΦ), or unimpaired, while maintaining a high compensation rate, while when less than 3.0, the cutoff wavelength $\lambda_c$ was held to not more than 1500 nm. Therefore, a ratio of diameters (a:b:c) of 1:(1.8 to 2.2):(2.7 to 3.0) was selected.

Examples of profiles, obtained by simulation, which can achieve good characteristics while maintaining low values of transmission loss are shown below.

TABLE 4

Results of Simulation of Negative Dispersion Fiber (2)

| Δ1 % | α | Δ2 % | Δ3 % | a:b:c | Dispersion (ps/nm/km) | Slope (ps/nm²/km) | $A_{eff}$ (μm²) | λc (nm) | Bending 20Φ (dB/m) |
|---|---|---|---|---|---|---|---|---|---|
| 0.71 | 10.0 | −0.48 | 0.18 | 1:1.9:2.8 | −11.9 | −0.032 | 32.2 | 1417 | 6.0 |
| 0.70 | 10.0 | −0.40 | 0.20 | 1:2.0:2.9 | −11.1 | −0.031 | 33.7 | 1486 | 4.0 |
| 0.68 | 10.0 | −0.46 | 0.19 | 1:1.9:2.9 | −10.6 | −0.026 | 32.8 | 1454 | 5.0 |

10th Embodiment

The inventors also studied whether the dispersion could be further suppressed for a negative dispersion optical fiber. To suppress the dispersion, it is effective to reduce the relative refractive index difference Δ1 between the cladding and the center core to close to 0.70% (for example, 0.65% to 0.75%). As explained above, however, a low relative refractive index difference Δ1 invites an increase in the transmission loss at the long wavelength side. To suppress the increase in transmission loss at the long wavelength side, the parameter a expressing the shape of the profile of the distribution of refractive index of the center core was made about 10. By doing this, it was learned that the dispersion slope becomes somewhat larger than that of the negative dispersion fibers of Table 3, but the optimization of the profile enabled a dispersion slope of not more than −0.020 ps/nm²/km to be obtained. The relative refractive index difference Δ2 between the cladding and the side core has to be at least −0.50% in order to suppress the bending loss to not more than 10 dB/m (20 mmΦ) while maintaining a low dispersion, but it was learned that if the relative refractive index difference Δ2 is not made −0.40% or less, the dispersion slope ends up becoming a large one of more than −0.02 ps/nm²/km. Further, to suppress an increase in the transmission loss at the long wavelength side, it is necessary that the relative refractive index difference Δ3 between the cladding and the segment core be 0.15% or more, but if the relative refractive index difference Δ3 is over 0.25, the cutoff wavelength $\lambda_c$ shifts to a long wavelength side and the single mode conditions can no longer be met.

Further, the inventors adjusted the ratio of a:b:c. When the ratio of a:b was 1:1.8 to 1:2.2, a low bending transmission loss characteristic of not more than 10 dB/m at 20 mmΦ could be obtained while maintaining good values of the other characteristics. When less than the ratio of 1.8, the absolute value of the dispersion becomes large, while when As clear from the above results, if constructing an optical transmission line by connecting the positive dispersion optical fiber 11 and negative dispersion optical fiber 12 shown in FIG. 1 of the present invention, a low non-linearity, low bending transmission loss characteristic, and a low dispersion slope are obtained. Further, since the optical transmission line 1 has a dispersion between that of the conventional RDF and NZ-DSF, the cumulative chromatic dispersion can be suppressed. Further, from the characteristics of the refractive index profile, the optical transmission line 1 achieves a low transmission loss characteristic over a broad range and a low PDM.

As explained above, the inventors developed a new type of optical transmission line combining a positive dispersion optical fiber and negative dispersion optical fiber and achieved a small cumulative chromatic dispersion, low non-linearity, low dispersion slope, and low PMD at the same time as a low transmission loss characteristic over a broad range. The characteristics of a low transmission loss, small cumulative chromatic dispersion, low PDM, low dispersion slope, and low non-linearity of this new optical transmission line are optimal for a high speed WDM transmission line. This new type of transmission line made using a positive dispersion optical fiber and negative dispersion optical fiber can be used to handle the bulk of future WDM transmission. Due to this, a transmission line suitable for high speed and large capacity transmission can be easily fabricated.

EXAMPLES

Next, the effectiveness of the optical fibers according to the embodiments of the present invention will be confirmed using examples.

Example 1

First, test production was conducted to obtain positive dispersion optical fibers having the step profile illustrated in FIG. 5. The results of the test production conducted with reference to simulation are shown in Table 5.

TABLE 5

Results of Test Production of Positive Dispersion Optical Fiber (Three-Layer Structure)

|   | 1.55 loss (dB/km) | 1.58 loss (dB/km) | Dispersion (ps/nm/km) | Slope (ps/nm²/km) | $A_{eff}$ ($\mu m^2$) | $\lambda c$ (nm) | Bending 20Φ (dB/m) | PMD (ps/km$^{1/2}$) |
|---|---|---|---|---|---|---|---|---|
| 1 | 0.193 | 0.191 | 14.6 | 0.070 | 96.5 | 1533 | 4.0 | 0.04 |
| 2 | 0.189 | 0.188 | 14.2 | 0.069 | 92.4 | 1546 | 3.5 | 0.04 |

Since the relative refractive index difference Δ1 between the cladding and center core is small, the transmission losses at 1.55 μm and 1.58 μm also become low values of about 0.19 dB/km. Further, Prototypes 1 and 2 both had effective sectional areas $A_{eff}$ of at least 90 μm² and thereby obtained values of $A_{eff}$ enlarged over that of a conventional SMF. Further, the dispersion in the 1.55 μm band is suppressed from that of an SMF. In addition, the dispersions of Prototypes 1 and 2 were sufficiently large compared with a conventional NZ-DSF, so the signal noise due to the FWM can also be expected to be suppressed. The cutoff wavelength $\lambda_c$ is somewhat large, but a value of not more than 1400 nm was obtained with measurement by the "22 m method" which is measured the $\lambda_c$ by using an optical fiber having a length of 22 m. The dispersion slope, bending transmission loss, PMD, and other characteristics were also excellent.

Example 2

Further, test production was conducted with reference to the results of the simulation for the four-layer structure profile as well. The results of the test production are shown in Table 6.

As clear from Table 6, by using a four-layer structure, it is possible to further suppress the dispersion to 11 to 13 ps/nm/km or so while maintaining the low transmission loss. Compared with the results of test production of Table 5, the effective sectional area $A_{eff}$ becomes somewhat smaller, but the cumulative chromatic dispersion can be further suppressed. The bending transmission loss becomes somewhat greater than the value in Table 5, but is held down to not more than 10 dB/m. The transmission loss at 1.58 μm also becomes 0.200 dB/km or so or a level not posing a problem.

Example 3

Further, the W+segment core type profile was used for test production to obtain negative dispersion optical fibers. The results of test production performed based on simulation are shown in Table 7.

TABLE 6

Results of Test Production of Positive Dispersion Optical Fiber (Four-Layer Structure)

|   | 1.55 loss (dB/km) | 1.58 loss (dB/km) | Dispersion (ps/nm/km) | Slope (ps/nm²/km) | $A_{eff}$ ($\mu m^2$) | $\lambda c$ (nm) | Bending 20Φ (dB/m) | PMD (ps/km$^{1/2}$) |
|---|---|---|---|---|---|---|---|---|
| 1 | 0.194 | 0.199 | 12.6 | 0.067 | 84.5 | 1523 | 7.0 | 0.04 |
| 2 | 0.195 | 0.202 | 11.2 | 0.067 | 80.4 | 1510 | 9.5 | 0.05 |

TABLE 7

Results of Test Production of Negative Dispersion Optical Fiber

|   | 1.55 loss (dB/km) | 1.58 loss (dB/km) | Dispersion (ps/nm/km) | Slope (ps/nm²/km) | $A_{eff}$ ($\mu m^2$) | $\lambda c$ (nm) | Bending 20Φ (dB/m) | PMD (ps/km$^{1/2}$) |
|---|---|---|---|---|---|---|---|---|
| 1 | 0.218 | 0.220 | −14.5 | −0.040 | 31.2 | 1453 | 4.0 | 0.06 |
| 2 | 0.216 | 0.221 | −14.2 | −0.031 | 32.7 | 1396 | 4.5 | 0.05 |

TABLE 7-continued

Results of Test Production of Negative Dispersion Optical Fiber

|   | 1.55 loss (dB/km) | 1.58 loss (dB/km) | Dispersion (ps/nm/km) | Slope (ps/nm²/km) | $A_{eff}$ ($\mu m^2$) | λc (nm) | Bending 20Φ (dB/m) | PMD (ps/km$^{1/2}$) |
|---|---|---|---|---|---|---|---|---|
| 3 | 0.215 | 0.228 | −12.0 | −0.035 | 31.9 | 1405 | 6.0 | 0.05 |
| 4 | 0.213 | 0.229 | −11.4 | −0.031 | 32.6 | 1462 | 7.5 | 0.04 |

From the results of Table 7, not only a low transmission loss of about 0.215 dB/km, but also extremely good results in the effective sectional area $A_{eff}$, dispersion compensation rate, PMD, etc. were obtained. Further, the bending transmission loss was also held to a relatively small level, while the transmission loss at 1.58 $\mu$m could be confirmed to be a stable characteristic of not more than 0.23 dB/km.

Figure 8A:
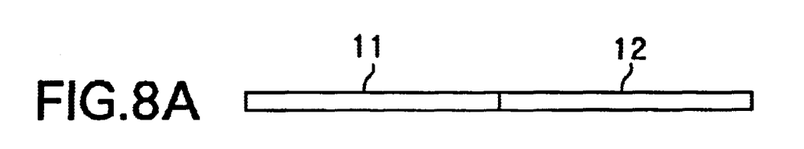
FIGS. 8A to 8C are views of examples of combinations of optical fibers making up one span of the optical transmission line of an embodiment of the present invention.

The optical transmission line of the present invention, as illustrated in FIG. 1 and FIG. 8A, may be comprised of a plurality of spans of optical transmission lines 1, each span comprising a positive dispersion optical fiber 11 and negative dispersion optical fiber 12 connected together, connected for the necessary distance.

Note that each span may be comprised in various ways in addition to the combination of a positive dispersion optical fiber 11 and negative dispersion optical fiber 12 illustrated in FIG. 1.

Figure 8B:
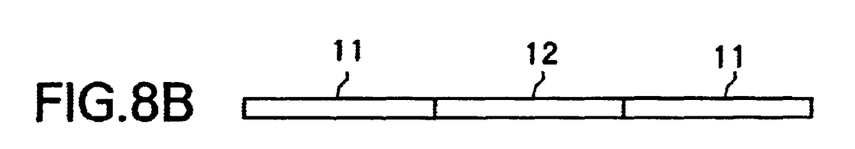

For example, to deal with two-way communication, as illustrated in FIG. 8B, it is also possible to construct an optical transmission line comprised of spans each consisting of a positive dispersion optical fiber, negative dispersion optical fiber, and positive dispersion optical fiber.

Figure 8C:
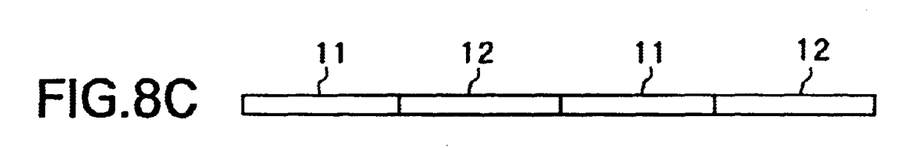

Further, to suppress an increase in the cumulative dispersion, as illustrated in FIG. 8C, each span can be comprised of four or more fibers.

The types and combinations of the optical fibers making up each span can be determined in accordance with the situation in line with the objective.

Every optical transmission line of the embodiments can give advantageous characteristics due to the above transmission loss characteristics.

Summarizing the effects of the invention, as explained above, according to the present invention, it is learned that a low non-linearity is achieved.

Further, every optical fiber exhibited a low PMD of 0.05 ps/km$^{1/2}$ or so. In this way, good results were obtained in terms of the total characteristics.

According to the present invention, construction of a low loss WDM transmission line suitable for high speed, large capacity transmission provided with both a low non-linearity with respect to SPM, XPM, FWM, etc. or dispersion flatness became possible.

While the invention has been described with reference to specific embodiments chosen for purpose of illustration, it should be apparent that numerous modifications could be made thereto by those skilled in the art without departing from the basic concept and scope of the invention.

What is claimed is:

1. An optical fiber transmission line comprising a positive dispersion optical fiber having a positive dispersion and a positive dispersion slope and a negative dispersion optical fiber having a negative dispersion and a negative dispersion slope and managing dispersion to have a non-zero dispersion in the 1.55 $\mu$m band, wherein transmission losses in the 1.55 $\mu$m band of the positive dispersion optical fiber and negative dispersion optical fiber are both not more than 0.23 dB/km and a difference of the transmission losses of the positive dispersion optical fiber and negative dispersion optical fiber is not more than 0.05 dB/km.

2. An optical fiber transmission line as set forth in claim 1, wherein one span is comprised of a first and second optical fiber, and said positive dispersion optical fiber is positioned at the front along the direction of the optical transmission as the first optical fiber and said negative dispersion optical fiber is positioned at the rear as said second optical fiber.

3. An optical fiber transmission line as set forth in claim 1, wherein one span is comprised of a first to third optical fiber, and said positive dispersion optical fiber serving as said first optical fiber, said negative dispersion optical fiber serving as said second optical fiber, and said positive dispersion optical fiber serving as said third optical fiber are connected in that order.

4. An optical fiber transmission line as set forth in claim 1, wherein a transmission loss at the 1.55 $\mu$m band and a transmission loss at the 1.58 $\mu$m band of said positive dispersion optical fiber and said negative dispersion optical fiber are both not more than 0.23 dB/km, and differences between transmission losses of said positive dispersion optical fiber and said negative dispersion optical fiber in the 1.55 $\mu$m band and the 1.58 $\mu$m band are not more than 0.05 dB/km.

5. An optical fiber transmission line as set forth in claim 1, wherein absolute values of dispersion of said positive dispersion optical fiber in the 1.55 $\mu$m band and said negative dispersion optical fiber in the 1.55 $\mu$m band are 10 to 15 ps/nm/km.

6. An optical fiber transmission line as set forth in claim 1, wherein polarization mode dispersions (PMD) of said positive dispersion optical fiber in the 1.55 $\mu$m band and said negative dispersion optical fiber in the 1.55 $\mu$m band are 0 to 0.06 ps/km$^{1/2}$.

7. An optical fiber transmission line as set forth in claim 1, wherein a transmission loss in the 1.55 $\mu$m band of said positive dispersion optical fiber is not more than 0.200 dB/km, a transmission loss in the 1.55 $\mu$m band of said negative dispersion optical fiber is not more than 0.230 dB/km, and a total transmission loss of said optical transmission line minus a connection loss when connecting said positive dispersion optical fiber and said negative dispersion optical fiber is not more than 0.215 dB/km.

8. An optical fiber transmission line as set forth in claim 1, wherein a transmission loss in the 1.55 μm band of said positive dispersion optical fiber is not more than 0.195 dB/km, a transmission loss in the 1.55 μm band of said negative dispersion optical fiber is not more than 0.225 dB/km, and a total transmission loss of said optical fiber transmission line is not more than 0.210 dB/km.

9. An optical fiber transmission line as set forth in claim 1, wherein a dispersion slope in the 1.55 μm band of said positive dispersion optical fiber is not more than 0.08 ps/nm$^2$/km, a dispersion slope in the 1.55 μm band of said negative dispersion optical fiber is not more than −0.020 ps/nm$^2$/km, and a total dispersion slope of said optical transmission line is not more than 0.03 ps/nm$^2$/km.

10. An optical fiber transmission line as set forth in claim 1, wherein an effective core area ($A_{eff}$) of said positive dispersion optical fiber is not less than 80 μm$^2$.

11. An optical fiber transmission line as set forth in claim 1, wherein an effective core area ($A_{eff}$) of said negative dispersion optical fiber is not less than 30 μm$^2$.

12. An optical fiber transmission line as set forth in claim 1, wherein a bending transmission loss at 20 mmΦ of said negative dispersion optical fiber is not more than 10 dB/m, and a difference in transmission loss at 1580 nm and transmission loss at 1550 nm is not more than 0.05 dB/km.

13. An optical fiber transmission line as set forth in claim 1, wherein said positive dispersion optical fiber has a center core, a side core formed around said center core, and a cladding formed around said side core; and said center core has a refractive index higher than the refractive index of said side core and the distribution of the refractive index forms a step structure.

14. An optical fiber transmission line as set forth in claim 13, wherein said positive dispersion optical fiber has a center core, a side core formed around said center core, a segment core formed around said side core, and a cladding formed around said segment core;

the distribution of a refractive index of said cladding, a refractive index of said segment core, a refractive index of said side core, and a refractive index of said center core forms a step structure;

a relative refractive index difference Δ1 between said cladding and said center core is 0.30 to 0.50%;

a relative refractive index difference Δ2 between said cladding and said side core is 0.05 to 0.25%; and a ratio (b/a) of a diameter (b) of said side core to a diameter (a) of said center core is 1.8 to 2.7.

15. An optical fiber transmission line as set forth in claim 1, wherein said positive dispersion optical fiber has a center core, a side core formed around said center core, a segment core formed around said side core, and a cladding formed around said segment core; and the distribution of a refractive index of said cladding, a refractive index of said segment core, and a refractive index of said side core forms a W+segment core structure.

16. An optical fiber transmission line as set forth in claim 15, wherein said positive dispersion optical fiber is formed by one of a segment core and W+segment core structure;

a relative refractive index difference Δ1 between a cladding and center core is 0.30 to 0.50%;

a relative refractive index difference Δ2 between a cladding and side core is −0.10 to 0.10%;

a relative refractive index difference Δ3 between a cladding and segment core is 0.10 to 0.25%;

a ratio a:b:c of a diameter (a) of said center core, a diameter (b) of said side core, and a diameter (c) of said segment core is 1:(1.3 to 1.9): (2.2 to 2.8).

17. An optical fiber transmission line as set forth in claim 1, wherein said negative dispersion fiber is formed by a W+segment core type structure.

18. An optical fiber transmission line as set forth in claim 17, wherein said negative dispersion optical fiber is formed by a W+segment core structure;

a relative refractive index difference Δ1 between a cladding and center core is 0.75 to 0.95%;

a relative refractive index difference Δ2 between a cladding and side core is −0.45 to 0.35%;

a relative refractive index difference Δ3 between a cladding and segment core is 0.15 to 0.25%;

a ratio a:b:c of a diameter (a) of said center core, a diameter (b) of said side core, and a diameter (c) of said segment core is 1:(1.7 to 2.0): (2.3 to 3.0).

19. An optical fiber transmission line as set forth in claim 17, wherein said negative dispersion optical fiber is formed by a W+segment core structure;

a relative refractive index difference Δ1 between a cladding and center core is 0.60 to 0.80%;

a relative refractive index difference Δ2 between a cladding and side core is −0.50 to 0.4%;

a relative refractive index difference Δ3 between a cladding and segment core is 0.15 to 0.25%;

a ratio a:b:c of a diameter (a) of said center core, a diameter (b) of said side core, and a diameter (c) of said segment core is 1:(1.8 to 2.2): (2.7 to 3.0).

* * * * *